United States Patent
Chou et al.

(10) Patent No.: US 9,041,776 B2
(45) Date of Patent: May 26, 2015

(54) 3-DIMENSIONAL DEPTH IMAGE GENERATING SYSTEM AND METHOD THEREOF

(71) Applicant: Wistron Corporation, New Taipei (TW)

(72) Inventors: Chia-Te Chou, New Taipei (TW); Shou-Te Wei, New Taipei (TW); Chih-Hsuan Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 324 days.

(21) Appl. No.: 13/652,491

(22) Filed: Oct. 16, 2012

(65) Prior Publication Data

US 2013/0321580 A1 Dec. 5, 2013

(30) Foreign Application Priority Data

Jun. 5, 2012 (TW) .............................. 101120159 A

(51) Int. Cl.
| | |
|---|---|
| *H04N 13/02* | (2006.01) |
| *H04N 13/04* | (2006.01) |
| *G06T 15/00* | (2011.01) |
| *H04N 13/00* | (2006.01) |

(52) U.S. Cl.
CPC ....... *H04N 13/0271* (2013.01); *H04N 13/0239* (2013.01); *H04N 2013/0081* (2013.01)

(58) Field of Classification Search
CPC .......... H04N 13/0239; H04N 13/0271; H04N 2013/0081; H04N 13/0018; G02B 27/2221
See application file for complete search history.

(56) References Cited

U.S. PATENT DOCUMENTS

| | | | | |
|---|---|---|---|---|
| 6,111,597 | A * | 8/2000 | Tabata ............................ | 348/43 |
| 2004/0218070 | A1 | 11/2004 | Hamalainen | |
| 2008/0158346 | A1 * | 7/2008 | Okamoto et al. ............... | 348/47 |
| 2009/0244275 | A1 * | 10/2009 | Masuda ......................... | 348/78 |
| 2009/0244313 | A1 * | 10/2009 | Masuda ..................... | 348/222.1 |

(Continued)

FOREIGN PATENT DOCUMENTS

| | | |
|---|---|---|
| CN | 101516040 | 8/2009 |
| JP | 2011095984 A * | 5/2011 |
| TW | 201216203 | 4/2012 |

OTHER PUBLICATIONS

English Abstract of JP 2011095984 A.*

(Continued)

*Primary Examiner* — Behrooz Senfi
*Assistant Examiner* — Mohammed Jebari
(74) *Attorney, Agent, or Firm* — Jianq Chyun IP Office

(57) ABSTRACT

A 3-dimensional depth image generating system and method thereof are provided. The 3-dimensional depth image generating system includes a first and a second camera devices and an image processing device. The first and the second camera devices are apart for a predetermined distance, and respectively captures an object to obtain a firs and a second images. The image processing device is connected with the first and the second camera devices and respectively obtains a first and a second partial images, wherein the first and the second partial images both include a first predetermined portion and a second predetermined portion of the object, and sizes of the first partial image and the second partial image are respectively smaller than that of the first image and the second image. Wherein, the image processing device combines the first and the second partial images to generate a 3-dimensional depth image of the object.

10 Claims, 5 Drawing Sheets

(56) References Cited

U.S. PATENT DOCUMENTS

| | | | |
|---|---|---|---|
| 2010/0289882 A1* | 11/2010 | Ohta | 348/51 |
| 2012/0019527 A1* | 1/2012 | Ugawa | 345/419 |
| 2012/0019528 A1* | 1/2012 | Ugawa et al. | 345/419 |
| 2012/0092462 A1 | 4/2012 | Li | |

OTHER PUBLICATIONS

"Office Action of Taiwan Counterpart Application", issued on Feb. 10, 2014, p. 1-p. 16.

"Office Action of China Counterpart Application", issued on Nov. 24, 2014, p. 1-p. 20.

\* cited by examiner

3-DIMENSIONAL DEPTH IMAGE GENERATING SYSTEM AND METHOD THEREOF

CROSS-REFERENCE TO RELATED APPLICATION

This application claims the priority benefit of Taiwan application serial no. 101120159, filed on Jun. 5, 2012. The entirety of the above-mentioned patent application is hereby incorporated by reference herein and made a part of this specification.

BACKGROUND OF THE INVENTION

1. Field of the Invention

The invention relates to an image generating system, and more particularly, the invention relates to a 3-dimensional depth image generating system and a method thereof.

2. Description of Related Art

With rapid development of technology and image capturing technology, many of the manufacturers have been focused on 3-dimensional image capturing technology, and schemed for various methods to operate electronic device by capturing the human movement through video recording devices. In which, by simulating human eyes using two different cameras to generate 3-dimensional depth image in connection, an electronic device may detect the variation within the depth image, as to determine what sort of operation the user would like to perform. The principle thereof is that when human eyes are watching the same object with miner angle differences, human eyes are actually watching at two images with miner differences, this is known as binocular disparity or retinal disparity. Human brain combines the two images with miner differences into a single image with layers and depth, which allows human brain to generate a stereoscopic 3-dimensional image.

However, when said two images in connection to the user are respectively captured by the said two cameras, it requires a completed analysis to the two images in order to generate a 3-dimensional depth image. In this case, the complexity of such analysis increases when the image size gets larger, thereby reducing the speed of the image processing.

SUMMARY OF THE INVENTION

Accordingly, the invention is directed to a 3-dimensional depth image generating system and a method thereof, in which a 3-dimensional depth image adapted for identifying the operative motions of the user is generated by using only two partial images of the original image, thereby reducing the time required for image processing.

The invention provides a 3-dimensional depth image generating system, which includes a first camera device, a second camera device and an image processing device. The first camera device is used for obtaining a first image by capturing an object. The second camera device is a predetermined distance apart from the first camera device, used for obtaining a second image by capturing the object. The image processing device is coupled to the first camera device and the second camera device, configured to obtain a first partial image and a second partial image respectively from the first image and the second image, wherein the first partial image and the second partial image both include a first predetermined portion of the object and a second predetermined portion of the object, and a size of the first partial image is smaller than a size of the first image, and a size of the second partial image is smaller than a size of the second image. Wherein, the image processing device combines the first partial image and the second partial image to generate a 3-dimensional image of the object.

In an embodiment of the invention, the image processing device detects a first portion feature in the first image to locate a first predetermined portion area of the first predetermined portion in the first image; outwardly detects a second portion feature to locate a second predetermined portion area of the second predetermined portion in the first image by using the first predetermined portion area as a center; and obtains the first partial image by defining a first area in the first image based on the first predetermined portion area and the second predetermined portion area in the first image.

In an embodiment of the invention, the image processing device detects the first portion feature in the second image to locate a first predetermined portion area of the first predetermined portion in the second image; outwardly detects the second portion feature to locate a second predetermined portion area of the second predetermined portion in the second image by using the first predetermined portion area as a center; and obtains the second partial image by defining a second area in the second image based on the first predetermined portion area and the second predetermined portion area in the second image.

In an embodiment of the invention, the image processing device obtains the second partial image by determining a second area in the second image based on a relative position of the first area in the first image.

In an embodiment of the invention, the image processing device defines a candidate area in the second image having a relative position the same to the relative position of the first area in the first image; and detects the first portion feature in the second image to locate a first predetermined portion area of the first predetermined portion in the second image. Next, the image processing device shifts the candidate area along a predetermined direction until the first predetermined portion area in the second image is covered by the candidate area and a relative position between the candidate area and the first predetermined portion area in the second image is identical to a relative position between the first area and the first predetermined portion area in the first image, and the image processing device uses the shifted candidate area as the second area.

In an embodiment of the invention, the image processing device defines a candidate area in the second image having a relative position the same to the relative position of the first area in the first image; and detects a first portion feature to locate a first predetermined portion area of the first predetermined portion in the second image. Next, the image processing device shifts the candidate area along a predetermined direction until a relative position between the candidate area and the first predetermined portion area in the second image is identical to a relative position between the first area and the first predetermined portion area in the first image, and the image processing device uses the shifted candidate area as the second area.

In an embodiment of the invention, the image processing device defines a candidate area in the second image having a relative position the same to the relative position of the first area in the first image; shifts the candidate area along a predetermined direction for a specific distance, and uses the shifted candidate area as the second area. In which, the specific distance has a mapping relation with the predetermined distance.

The invention provides a 3-dimensional depth image generating method, adapted for a 3-dimensional depth image generating system, said method includes the following steps.

Firstly, obtaining a first image by capturing the object using a first camera device, while obtaining a second image by capturing the object using a second camera device, and the second camera device is a predetermined distance apart from the first camera device. Next, obtaining a first partial image and a second partial image respectively from the first image and the second image. Wherein, the first partial image and the second partial image both include a first predetermined portion of the object and a second predetermined portion of the object, and a size of the first partial image is smaller than a size of the first image, and a size of the second partial image is smaller than a size of of the second image. Next, combining the first partial image and the second partial image to generate a 3-dimensional depth image of the object.

In an embodiment of the invention, the step of obtaining the first partial image in the first image includes detecting a first portion feature in the first image to locate a first predetermined portion area of the first predetermined portion in the first image. Next, outwardly detecting a second portion feature to locate a second predetermined portion area of the second predetermined portion in the first image by using the first predetermined portion area as a center. Next, obtaining the first partial image by defining a first area in the first image based on the first predetermined portion area and the second predetermined portion area in the first image.

In an embodiment of the invention, the step of obtaining the second partial image in the second image includes detecting the first portion feature in the second image to locate a first predetermined portion area of the first predetermined portion in the second image. Next, outwardly detecting the second portion feature to locate a second predetermined portion area of the second predetermined portion in the second image by using the first predetermined portion area as a center. Next, obtaining the second partial image by defining a second area in the second image based on the first predetermined portion area and the second predetermined portion area in the second image.

In an embodiment of the invention, the step of obtaining the second partial image in the second image includes obtaining the second partial image by determining a second area in the second image based on a relative position of the first area in the first image after the first area is defined.

In an embodiment of the invention, the step of obtaining the second partial image by determining a second area in the second image based on a relative position of the first area in the first image includes defining a candidate area in the second image having a relative position the same to the relative position of the first area in the first image. Next, detecting the first portion feature in the second image to locate a first predetermined portion area of the first predetermined portion in the second image.

Next, shifting the candidate area along a predetermined direction until the first predetermined portion area in the second image is covered by the candidate area and a relative position between the candidate area and the first predetermined portion area in the second image is identical to a relative position between the first area and the first predetermined portion area in the first image, and then using the shifted candidate area as the second area.

In an embodiment of the invention, the step of obtaining the second partial image by determining a second area in the second image based on a relative position of the first area in the first image includes defining a candidate area in the second image having a relative position the same to the relative position of the first area in the first image. Next, detecting the first portion feature in the candidate area to locate a first predetermined portion area of the first predetermined portion in the second image. Next, shifting the candidate area along a predetermined direction until a relative position between the candidate area and the first predetermined portion area in the second image is identical to a relative position between the first area and the first predetermined portion area in the first image, and then using the shifted candidate area as the second area.

In an embodiment of the invention, the step of obtaining the second partial image by determining a second area in the second image based on a relative position of the first area in the first image includes defining a candidate area in the second image having a relative position the same to the relative position of the first area in the first image. Next, shifting the candidate area along a predetermined direction for a specific distance and using the shifted candidate area as the second area. Wherein, the specific distance has a mapping relation with the predetermined distance.

In an embodiment of the invention, the object is a human body, the first predetermined portion is a hand portion of the human body and the second predetermined portion is a face portion of the human body.

Based on above, the present invention provides a 3-dimensional depth image generating system and method thereof, with operations of generating a 3-dimensional depth image, the image processing device may determine which operation the user is intended to operate according to motions of the user captured by the first camera device and the second camera device. Further, the image processing device of the invention respectively detects the first predetermined portion and the second predetermined portion in the first image and the second image to define the first partial image and the second partial image. Since the present invention generates the 3-dimensional depth image by using the first partial image and the second partial image rather than using the entire first image and the entire second image, as a result, the complexity of the image processing may be reduced by processing with smaller partial images.

To make the aforementioned and other features and advantages of the invention more comprehensible, several embodiments accompanied with figures are described in detail below.

DESCRIPTION OF THE EMBODIMENTS

Figure 1A:
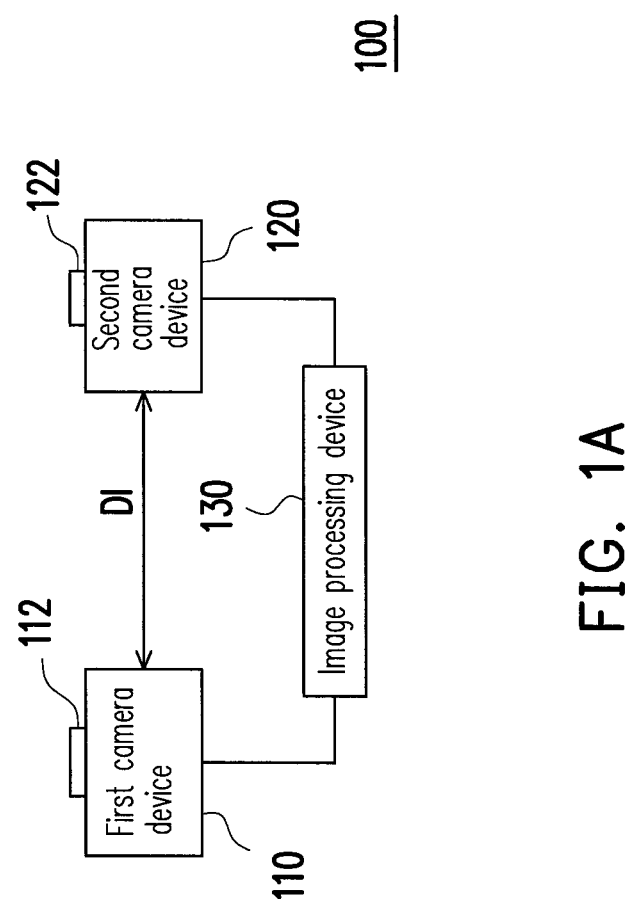
FIG. 1A is a schematic view illustrating a 3-dimensional depth image generating system according to an embodiment of the invention.

FIG. 1A is a schematic view illustrating a 3-dimensional depth image generating system according to an embodiment of the invention. In the present embodiment, a 3-dimensional depth generating system 100 includes a first camera device 110, a second camera device 120 and an image processing device 130. The first camera device 110 is used for obtaining a first image by capturing an object. The second camera device 120 is a predetermined distance DI apart from the first camera device 110, used for obtaining a second image by capturing the object. The first camera device 110 and the second camera device 120 are disposed parallel to each other, and respectively includes a lens 112 and a lens 122. The lens 112 and the lens 122 are disposed on the same plane, and respectively used for receiving lights from the object. Wherein, the lens 112 and the lens 122 may be a Charge Coupled Device (CCD) lens or a Complementary Metal-Oxide Semiconductor (CMOS) lens, and the first camera device 110 and a second camera device 120 may be a camera or a video camera, but the invention is not limited thereto.

The image processing device 130 is connected with the first camera device 110 and the second camera device 120, and respectively used for obtaining a first partial image from the first image captured by the first camera device 110 and obtaining a second partial image from the second image captured by the second camera device 120. Wherein, the first partial image and the second partial image both include a first predetermined portion and a second predetermined portion of the object to be captured. And, the image processing device 130 may combine the first partial image and the second partial image to generate a 3-dimensional depth image of the object. For example, the image processing device 130 may be hardware components such as a processing chip, a processor or a computer system, or software components having capability of processing image (For example, applications that may identify, capture and edit images). In addition, the image processing device 130 may also be a combination of hardware and software components.

The 3-dimensional depth image generating system 100 may be disposed in any electronic device having a motion sensor system. In particular, the motion sensor system may analyze gestures and motions of the user from the 3-dimensional depth image generated by the 3-dimensional depth image generating system 100, thereby controlling the electronic device to generate corresponding operations as a response.

Since the image processing device 130 may generate a 3-dimensional depth image from two relatively smaller partial images, analyzing of the user motions will be processed within a smaller range, thereby substantially reducing the time required for processing the image.

Figure 1B:
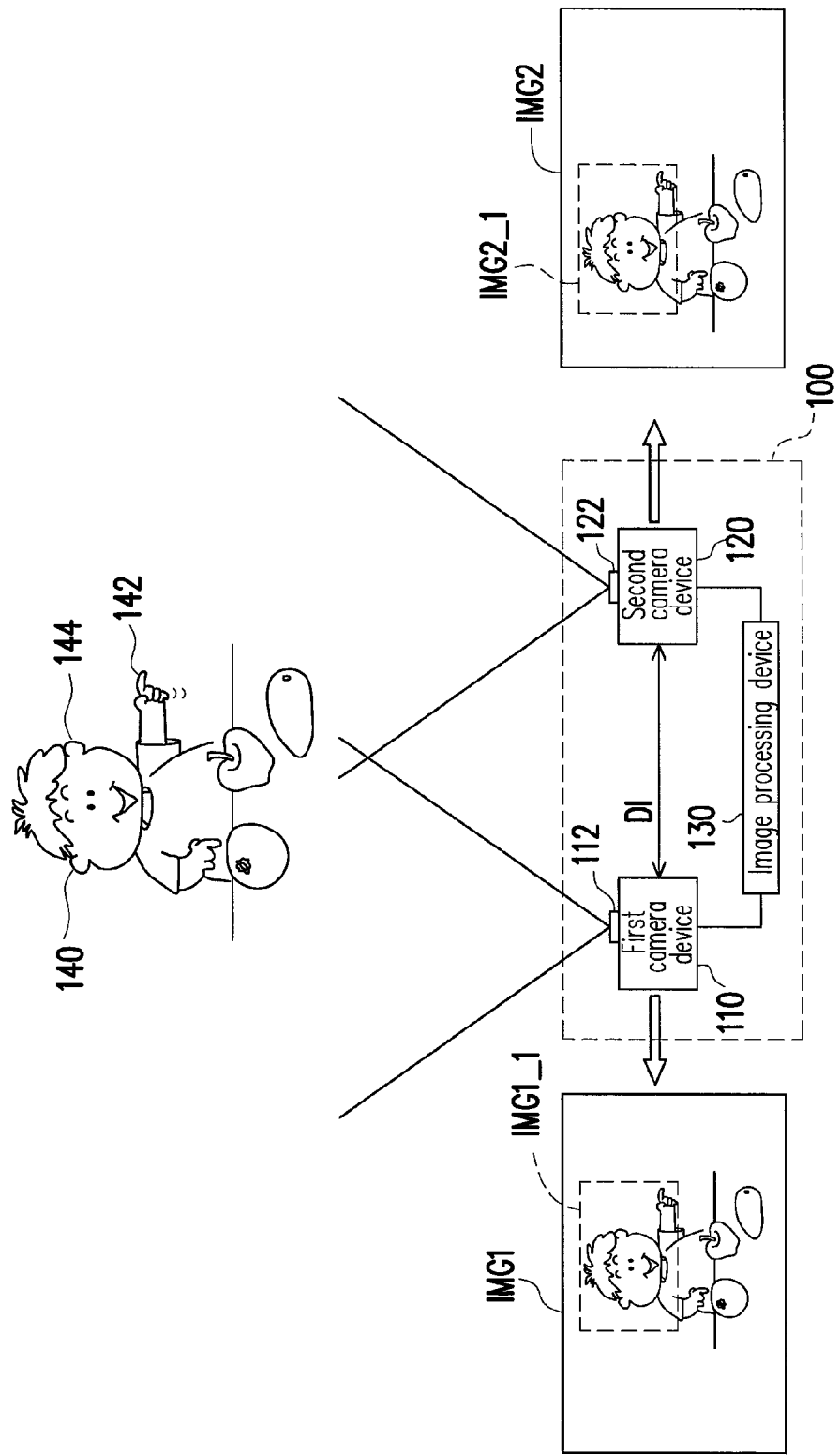
FIG. 1B is a schematic view illustrating a 3-dimensional depth image generated by the 3-dimensional depth image generating system according to an embodiment of the invention.

FIG. 1B is a schematic view illustrating a 3-dimensional depth image generated by the 3-dimensional depth image generating system according to an embodiment of the invention. In the present embodiment, it is assumed that the object being captured is a human body 140, wherein the first predetermined portion may be, for example, a hand portion 142 of the human body 140, and the second predetermined portion may be, for example, a face portion 144 of the human body 140. The steps for generating a 3-dimensional depth image of the object (i.e. the human body 140) using the 3-dimensional depth image generating system 100 are described in detail below with reference to the flowchart of FIG. 1C.

Figure 1C:
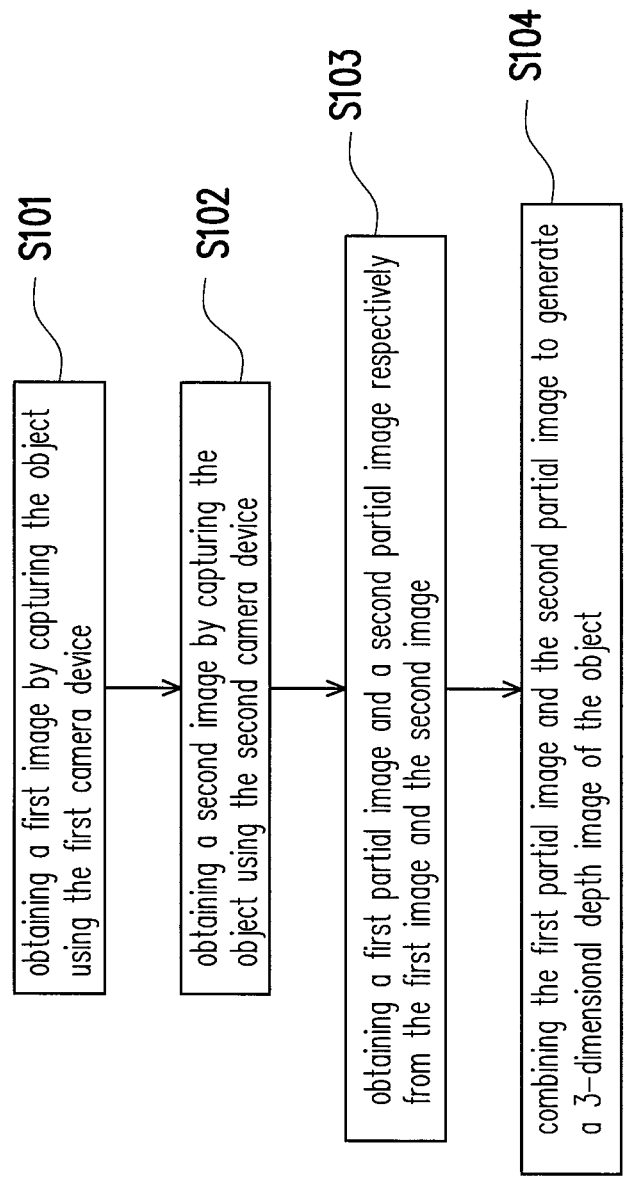
FIG. 1C is a flowchart illustrating a 3-dimensional depth image generating method according to an embodiment of the invention.

FIG. 1C is a flowchart illustrating a 3-dimensional depth image generating method according to an embodiment of the invention. Referring the FIG. 1B and FIG. 1C together, as shown in step S101, obtaining a first image IMG1 by capturing the object (i.e. the human body 140) using the first camera device 110. In step S102, obtaining a second image IMG2 by capturing the human body 140 using the second camera device 120. Wherein, the first camera device 110 and the second camera device 120, for example, capture the human body 140 simultaneously. Since the first camera device 110 and the second camera device 120 may be regarded to as capturing the human body 140 with the same direction, when a predetermine distance DI is relatively small (for example, 6 cm), the first image IMG1 and the second image IMG2 respectively obtained should be similar to each other. Therefore, the first camera device 110 and the second camera device 120 may be used to simulate two eyes of human, such that the first image IMG1 and the second image IMG2 may be respectively simulated to as the images respectively captured by the human eyes. In this case, the predetermined distance DI may be regarded to as a distance between the human eyes, such that the first image IMG1 and the second image IMG2 may have a horizontal shift similar to binocular disparity. For example, when the first camera device 110 is disposed on the left side of the second camera device 120 and the predetermined distance DI is, for example, 6 cm, frame in the second image IMG2 may be similar to frame in the first image IMG1 after being shifted to the left.

Next, as shown in step S103, the image processing device 130 obtains a first partial image IMG1_1 and a second partial image IMG2_1 respectively from the first image IMG1 and the second image IMG2, wherein the first partial image IMG1_1 and the second partial image IMG2_1 both include the hand portion 142 and the face portion 144 of the human body 140, and a size of the first partial image IMG1_1 is smaller than a size of the first image IMG1 and a size of the second partial image IMG2_1 is smaller than a size of the second image IMG2. Next, as shown in step S104, the image processing device 130 may combine the first partial image IMG1_1 and the second partial image IMG2_1 to generate a 3-dimensional depth image of the human body 140.

In one embodiment, the 3-dimensional depth image generating system 100 may be, for example, integrated with a smart TV, and the first camera device 110 and the second camera device 120 may be disposed on top of the monitor of the smart TV for capturing the user (e.g. the human body 140) in front of the smart TV and generating a 3-dimensional depth image of the user by the image processing device 130. Wherein, the image processing device 130 may be a built-in image processor disposed inside of the smart TV. By using the 3-dimensional depth image generating method as described in FIG. 1C, the image processing device 130 may generate a 3-dimensional depth image that only has the hand portion 142 and the face portion 144 of the user according to images including the user captured by the first camera device 110 and the second camera device 120. The built-in motion sensor system in the smart TV may determine what kind of operation (for example, switching channels, adjusting volume or switching audio channels) the user wishes to perform by tracking motions of the user based on the 3-dimensional depth image. It is noted that, in the present embodiment of the invention, the 3-dimensional depth image is generated by combining the first partial image and the second partial image including only the hand portion 142 and face portion 144 of the user to generate the 3-dimensional depth image instead of combining the first image IMG1 and the second image IMG2 further including other backgrounds. Therefore, since the image size for processing is smaller, the complexity of the image processing may also be reduced. In addition, motions of the user may be detected and tracked by detecting the variation within the area of the 3-dimensional depth image without detecting any other image area, such that the complexity of detection may be effectively reduced.

The detailed steps for the image processing device 130 to obtain the first partial image IMG1_1 and the second partial image IMG2_1 are described below with reference to three embodiments provided.

[First Embodiment]

Figure 2:
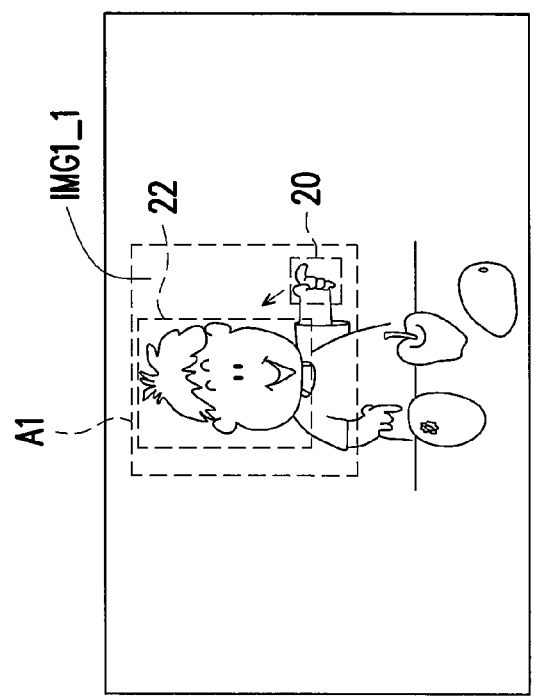
FIG. 2 is a schematic view illustrating a process of obtaining a first partial image according to an embodiment of the present invention.

FIG. 2 is a schematic view illustrating a process of obtaining a first partial image according to an embodiment of the present invention. In the present embodiment, the image processing device 130 may include a hand image database and a face image database, allowing the image processing device 130 to identify the hand position and the face position in an image received according to the hand image database and the face image database.

In particular, when the first image IMG1 is received by the image processing device 130, an area of the hand portion 142 in the first image IMG1 (which is referred to as the first predetermined portion area 20 hereinafter) may be obtained by detecting a first portion feature (i.e. a hand portion feature) in the first image IMG1. After the first predetermined portion area 20 is obtained, the image processing device 130 may set the first predetermined portion area 20 as the a center to outwardly detect whether a second portion feature (i.e. a face portion feature) can be found, thereby obtaining an area of the face portion 144 (which is referred to as the second predetermined portion area 22 hereinafter) in the first image IMG1. Next, the image processing device 130 may define a first area A1 including the first predetermined portion area 20 and the second predetermined area 22 according to positions the first predetermined portion area 20 and the second predetermined area 22, such that the first partial image IMG1_1 may be obtained accordingly. For example, the first area A1 may be a smallest rectangle including the first predetermined portion area 20 and the second predetermined portion area 22. Nonetheless, the invention is not limited thereto.

It is noted that, although the first image IMG1 has two hand portion features, the image processing device 130 may obtain the first partial image IMG1_1 by detecting only one of the hand portion features. However, in other embodiments, the image processing device 130 may also obtain the first partial image on the basis of detecting both two hand portion features.

Figure 3:
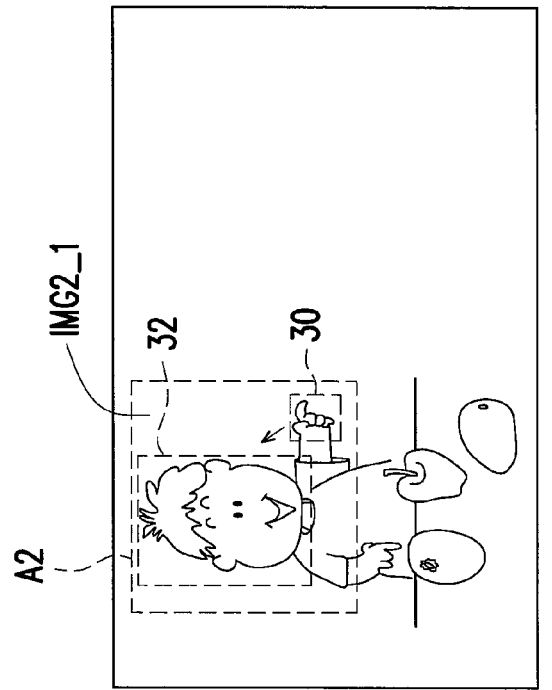
FIG. 3 is a schematic view illustrating a process of obtaining a second partial image according to an embodiment of the present invention.

FIG. 3 is a schematic view illustrating a process of obtaining a second partial image according to an embodiment of the present invention. In the present embodiment, when the second image IMG2 is received by the image processing device 130, the same method as described in the example of FIG. 2 may also be adapted to obtain the second partial image IMG2_1. In other words, the image processing device 130 may also obtain a first predetermined portion area 30 corresponding to the hand portion 142 in the second image IMG2 first, thereby obtaining a second predetermined portion area 32 corresponding to the face portion 144. Next, a second area A2 is defined based on the first predetermined portion area 30 and the second predetermined portion area 32, such that the second partial image IMG2_1 may be obtained accordingly.

In short, in the present embodiment, the image processing device 130 respectively detects the first predetermined portion (i.e. the hand portion) and the second predetermined portion (i.e. the face portion) in the first image IMG1 and the second image IMG2, such that the first partial image IMG1_1 and the second partial image IMG2_1 may be obtained.

[Second Embodiment]

In the present embodiment, the image processing device 130 obtains a first partial image IMG1_1 from the first image IMG1 with a method similar to the first embodiment. Next, the image processing device 130 obtains the second partial image by determining a second area in the second image IMG2 based on a relative position of the first area A1 in the first image IMG1.

Figure 4:
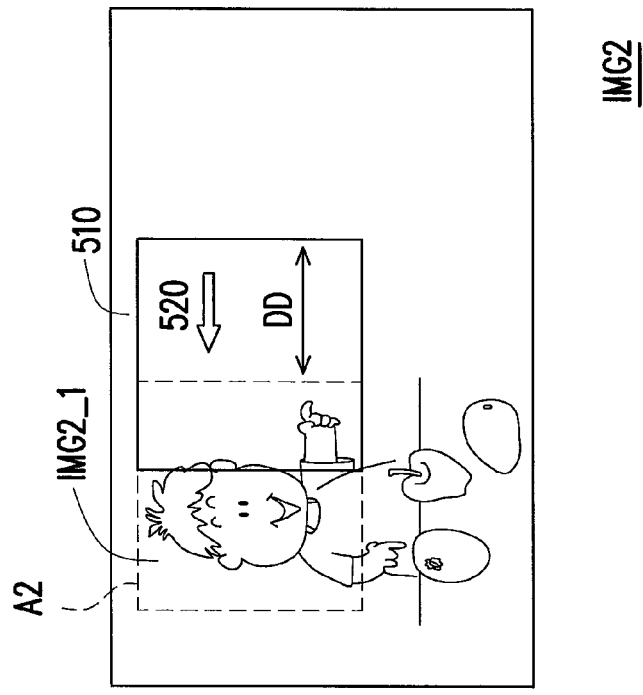
FIG. 4 is a schematic view illustrating a process of obtaining a second partial image according to another embodiment of the present invention.

The detailed steps for the image processing device 130 to obtain the second partial image IMG2_1 from the second image IMG2 are described below with reference to FIG. 4. Referring the FIG. 2 and FIG. 4 together, in the present embodiment, if the position of the first area A1 in the first image IMG1 as shown in FIG. 2 has been determined by the image processing device 130, a candidate area 410 in the second image IMG2 may be defined by the image processing device 130 according to the relative position of the first area A1 in the first image IMG1. Specifically, the candidate area 410 having the same size to that of the first area A1 may be defined in the second image IMG2 by the image processing device 130. In this case, distances between the candidate area 410 and four edges of the second area IMG2 match the distances between the first area A1 and four edges of the first image IMG1.

Next, the image processing device 130 detects the first portion feature (i.e. the hand portion feature) in the second image IMG2, such that an area of the first predetermined portion in the first image IMG1 (hereinafter, first predetermined portion area 40) may be obtained. Next, by shifting the candidate area 410 along a predetermined direction 420 until the first predetermined portion area 40 is covered by the candidate area 410, the image processing device 130 may use the shifted candidate area 410 as the second area A2, such that the second partial image IMG2_1 may be obtained accordingly.

To be specific, only horizontal direction of binocular disparity is existed between the first image IMG1 and the second image IMG2 since the first camera device 110 and the second camera device 120 are disposed on the same plane. Because the first camera device 110 is disposed on the left side of the second camera device 120, the image processing device 130 may shift the candidate area 410 along horizontal axis to the left until the first predetermined portion area 40 is covered by the candidate area 410 and a relative position between the candidate area 410 and the first predetermined portion area 40 is identical to a relative position between the first area A1 and the first predetermined portion area 20 in the first image IMG1. At this time, the image processing device 130 stops shifting the candidate area 410, and uses the shifted candidate area 410 as the second area A2. In other words, the relative position between the second area A2 and the first predetermined portion areas 40 in the second image IMG2 is identical to the relative position between the first area A1 and the first predetermined portion areas 20 in the first image IMG1.

As described above, since the predetermine distance DI is relatively small, the first image IMG1 and the second image IMG2 respectively obtained by the first camera device 110 and the second camera device 120 may be similar to each other, so that the possibility of the candidate area 410 including the first predetermined portion is relatively high. Therefore, in order to further increase the speed of image processing, the image processing device 130 may obtain the area of the first predetermined portion in the second image IMG2 by only detecting the first portion feature (i.e. the hand portion feature) in the candidate area 410 instead of detecting the entire second image IMG2. Next, the image processing device 130 may obtain the second area A2 and the second partial image IMG2_1 by only shifting the candidate area 410 along horizontal axis to the left until the relative position of the first predetermined portion area 40 and the candidate area 410 is identical to the relative position of the first predetermined portion area 20 and the first area A1.

It is noted that, the predetermined direction above may be adjusted according to the relative position between the first camera device 110 and the second camera device 120. For example, if the first camera device 110 is disposed on the right side of the second camera device 120 in FIG. 1, since the relative position of the images captured are varied, the predetermined direction may be adjusted accordingly to be along a horizontal direction to the right.

[Third Embodiment]

In the present embodiment, the image processing device 130 obtains a first partial image IMG1_1 from the first image IMG1 using a method similar to the first embodiment. The detailed steps for the image processing device 130 to obtain the second partial image IMG2_1 in the second image IMG2 are described below with reference to FIG. 5.

Figure 5:
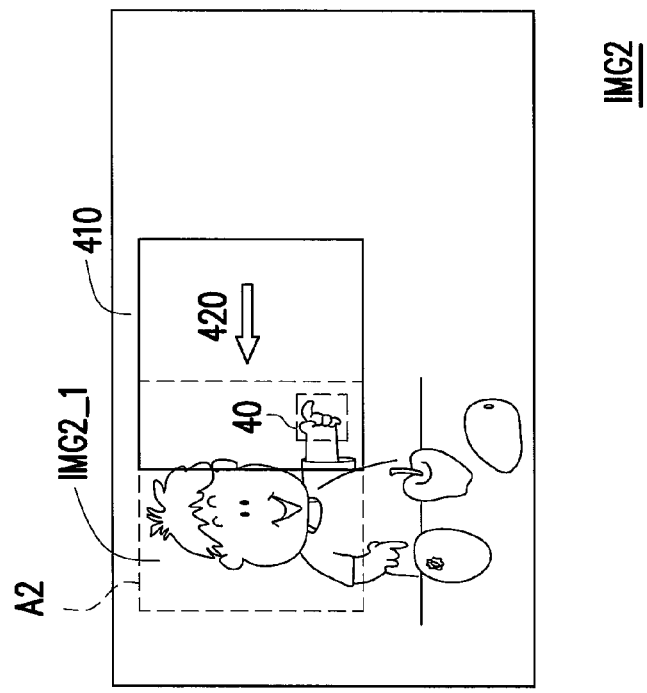
FIG. 5 is a schematic view illustrating a process of obtaining a second partial image according to yet another embodiment of the present invention.

Referring the FIG. 2 and FIG. 5 together, in the present embodiment, a candidate area 510 in the second image IMG2 may also be defined by the image processing device 130 according to the relative position of the first area A1 in the first image IMG1. The defining method of the candidate area 510 is similar to that of the second embodiment, and therefore detailed descriptions are omitted herein.

Next, the image processing device 130 may shift the candidate area 510 along a predetermined direction 520 for a specific distance DD, and directly use the shifted candidate area 510 as the second area A2 to obtain the second partial image IMG2_1 accordingly. Wherein, the specific distance DD may be simulated as a distance of binocular disparity between the first image IMG1 and the second image IMG2, and the specific distance DD has a mapping relation with the predetermined distance DI between the first camera device 110 and the second camera device 120. Therefore, in the present embodiment, if the length of the predetermined distance DD is already known, the length of the specific DD may be calculated based on the mapping relation as mentioned above. In this case, the image processing device 130 may obtain the second partial image IMG2_1 by directly shifting the candidate area 510 for a specific distance DD after the candidate area 510 is defined.

In short, the difference between the second embodiment and the third embodiment lies where in the second embodiment (referring to FIG. 4), the second area is determined by locating the first portion feature to shift the candidate area to a proper position after the candidate area is obtained. Whereas in the third embodiment (referring to FIG. 5), position of the second area is determined by directly shifting the candidate area based on distance of binocular disparity between the first image IMG1 and the second image IMG2.

Based on above, the invention provides a 3-dimensional depth image generating system and method thereof that respectively detects the first predetermined portion and the second predetermined portion of the first image and the second image to define two smaller partial images, and generates the 3-dimensional depth image by combining the two partial images. The 3-dimensional depth image generating system and method thereof in the invention generates the 3-dimensional depth image by using the two partial images instead of using the entire first and second images. As a result, the complexity of the image processing may be reduced by processing with smaller partial images.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A 3-dimensional depth image generating system, comprising:
    a first camera device, configured to obtain a first image by capturing an object;
    a second camera device, being a predetermined distance apart from the first camera device, configured to obtain a second image by capturing the object; and
    an image processing device, coupled to the first camera device and the second camera device, configured to obtain a first partial image and a second partial image respectively from the first image and the second image, wherein the first partial image and the second partial image both include a first predetermined portion of the object and a second predetermined portion of the object, and a size of the first partial image is smaller than a size of the first image, and a size of the second partial image is smaller than a size of the second image,
    wherein the image processing device detects a first portion feature in the first image to locate a first predetermined portion area of the first predetermined portion in the first image, outwardly detects a second portion feature to locate a second predetermined portion area of the second predetermined portion in the first image by using the first predetermined portion area as a center, and obtains the first partial image by defining a first area in the first image based on the first predetermined portion area and the second predetermined portion area,
    wherein the image processing device obtains the second partial image by determining a second area in the second image based on a relative position of the first area in the first image,
    wherein the image processing device defines a candidate area in the second image having a relative position the same to the relative position of the first area in the first image, and detects the first portion feature in the second image to locate a first predetermined portion area of the first predetermined portion in the second image, wherein distances between the candidate area and four edges of the second image match the distances between the first area and four edges of the first image,
    the image processing device shifts the candidate area along a predetermined direction until the first predetermined portion area in the second image is covered by the candidate area and a relative position between the candidate area and the first predetermined portion area in the second image is identical to a relative position between the first area and the first predetermined portion area in the first image, and uses the shifted candidate area as the second area,
    wherein the image processing device combines the first partial image and the second partial image to generate a 3-dimensional depth image of the object.

2. The 3-dimensional depth image generating system of claim 1, wherein the image processing device detects the first portion feature in the second image to locate a first predetermined portion area of the first predetermined portion in the second image, outwardly detects the second portion feature to locate a second predetermined portion area of the second predetermined portion in the second image by using the first predetermined portion area as a center, and obtains the second partial image by defining a second area in the second image based on the first predetermined portion area and the second predetermined portion area.

3. The 3-dimensional depth image generating system of claim 1, wherein the image processing device defines a candidate area in the second image having a relative position the same to the relative position of the first area in the first image, and detects the first portion feature in the candidate area to locate a first predetermined portion area of the first predetermined portion in the second image, the image processing device shifts the candidate area along a predetermined direction until a relative position between the candidate area and the first predetermined portion area in the second image is identical to a relative position between the first area and the first predetermined portion area in the first image, and uses the shifted candidate area as the second area.

4. The 3-dimensional depth image generating system of claim 1, wherein the image processing device defines a candidate area in the second image having a relative position the same to the relative position of the first area in the first image, shifts the candidate area along a predetermined direction for a specific distance, and uses the shifted candidate area as the second area, wherein the specific distance has a mapping relation with the predetermined distance.

5. The 3-dimensional depth image generating system of claim 1, wherein the object is a human body, the first predetermined portion is a hand portion of the human body and the second predetermined portion is a face portion of the human body.

6. A 3-dimensional depth image generating method, adapted for a 3-dimensional depth image generating system, comprising:

obtaining a first image by capturing an object using a first camera device;

obtaining a second image by capturing the object using a second camera device, wherein the second camera device is a predetermined distance apart from the first camera device;

obtaining a first partial image and a second partial image respectively from the first image and the second image, wherein the first partial image and the second partial image both include a first predetermined portion of the object and a second predetermined portion of the object, and a size of the first partial image is smaller than a size of the first image, and a size of the second partial image is smaller than a size of the second image, wherein the step of obtaining the first partial image from the first image comprises:

detecting a first portion feature in the first image to locate a first predetermined portion area of the first predetermined portion in the first image;

outwardly detecting a second portion feature to locate a second predetermined portion area of the second predetermined portion in the first image by using the first predetermined portion area as a center; and obtaining the first partial image by defining a first area in the first image based on the first predetermined portion area and the second predetermined portion area in the first image, wherein the step of obtaining the second partial image from the second image comprises:

obtaining the second partial image by determining a second area in the second image based on a relative position of the first area in the first image after the first area is defined, wherein the step of obtaining the second partial image by determining the second area in the second image based on the relative position of the first area in the first image comprises:

defining a candidate area in the second image having a relative position the same to the relative position of the first area in the first image, wherein distances between the candidate area and four edges of the second image match the distances between the first area and four edges of the first image;

detecting the first portion feature in the second image to locate a first predetermined portion area of the first predetermined portion in the second image; and shifting the candidate area along a predetermined direction until the first predetermined portion area in the second image is covered by the candidate area and a relative position between the candidate area and the first predetermined portion area in the second image is identical to a relative position between the first area and the first predetermined portion area in the first image, and then using the shifted candidate area as the second area; and combining the first partial image and the second partial image to generate a 3-dimensional depth image of the object.

7. The 3-dimensional depth image generating method of claim 6, wherein the step of obtaining the second partial image from the second image comprises:

detecting the first portion feature in the second image to locate a first predetermined portion area of the first predetermined portion in the second image;

outwardly detecting the second portion feature to locate a second predetermined portion area of the second predetermined portion in the second image by using the first predetermined portion area as a center; and obtaining the second partial image by defining a second area in the second image based on the first predetermined portion area and the second predetermined portion area in the second image.

8. The 3-dimensional depth image generating method of claim 6, wherein the step of obtaining the second partial image by determining the second area in the second image based on the relative position of the first area in the first image comprises:

defining a candidate area in the second image having a relative position the same to the relative position of the first area in the first image;

detecting the first portion feature in the candidate area to locate a first predetermined portion area of the first predetermined portion in the second image; and shifting the candidate area along a predetermined direction until a relative position between the candidate area and the first predetermined portion area in the second image is identical to a relative position between the first area and the first predetermined portion area in the first image, and then using the shifted candidate area as the second area.

9. The 3-dimensional depth image generating method of claim 6, wherein the step of obtaining the second partial image by determining the second area in the second image based on the relative position of the first area in the first image comprises:

defining a candidate area in the second image having a relative position the same to the relative position of the first area in the first image; and shifting the candidate area along a predetermined direction for a specific distance and using the shifted candidate area as the second area, wherein the specific distance has a mapping relation with the predetermined distance.

10. The 3-dimensional depth image generating method of claim 6, wherein the object is a human body, the first predetermined portion is a hand portion of the human body and the second predetermined portion is a face portion of the human body.

* * * * *